Feb. 27, 1962  F. V. VODOKLYS  3,023,339
PHOSPHOR, LAMP AND METHOD
Filed Oct. 29, 1959  2 Sheets-Sheet 1

*INVENTOR.*
F. V. VODOKLYS.
BY
W. D. Palmer
ATTORNEY.

Feb. 27, 1962 F. V. VODOKLYS 3,023,339
PHOSPHOR, LAMP AND METHOD
Filed Oct. 29, 1959 2 Sheets-Sheet 2

INVENTOR
F. V. VODOKLYS.

BY W. D. Palmer
ATTORNEY

United States Patent Office 3,023,339
Patented Feb. 27, 1962

3,023,339
PHOSPHOR, LAMP AND METHOD
Frank V. Vodoklys, Wayne, N.J., assignor to Westinghouse Electric Corporation, East Pittsburgh, Pa., a corporation of Pennsylvania
Filed Oct. 29, 1959, Ser. No. 849,532
14 Claims. (Cl. 313—109)

This invention relates to phosphors, fluorescent lamps and methods for producing improved halophosphate phosphors for fluorescent lamps and, more particularly, to an improved halophosphate phosphor, a fluorescent lamp which incorporates such improved halophosphate phosphor and methods for processing halophosphate phosphors to improve their output.

Halophosphate phosphor materials for fluorescent lamps are well known and are described in U.S. Patent No. 2,488,733, dated November 22, 1949. These phosphors are generally analogous to the natural mineral apatite and will display substantially the same X-ray diffraction pattern as this mineral. Such phosphors are conveniently represented by the matrix $3M_3(PO_4)_2 \cdot 1M'L_2$, where L represents a halogen or mixture of halogens and M and M' represent either different or identical bivalent metals or mixtures of such metals. In practice, the primary constituent for most halophosphate phosphor is calcium orthophosphate although strontium orthophosphate is used in some limited cases. The halide constituent normally comprises calcium chloride or fluoride or strontium chloride or fluoride or mixtures of both and the activator materials are normally antimony or antimony plus manganese. The great majority of fluorescent lamps which are presently manufactured in this country incorporate such a phosphor and the term "halophosphate" has become generic to the art for a phosphor of the foregoing general formulation and structure.

In the usual procedures for preparing halophosphate phosphors, the raw-mix constituents are thoroughly mixed and are fired under predetermined conditions. The first-fired phosphor is desirably reduced to finely-divided status and then refired, in order to improve its output. Thereafter the phosphor is again reduced to finely-divided status, such as by crushing in a hammermill. The resulting finely-divided phosphor may then be washed with an acidic or a basic solution as disclosed in U.S. Patent No. 2,691,601, dated October 12, 1954. This apparently removes damaged or weakly-luminescent particles and the washed phosphor is rinsed to remove any residual traces of acidic or basic washing solution. To facilitate drying, the rinsed and still damp phosphor is placed into trays and oven dried at somewhat elevated temperatures. Thereafter the dried phosphor is incorporated into a coating suspension or so-called "paint" which is used to coat the inner surface of the fluorescent lamp tube. In accordance with past practices, in order to produce a desired coating texture for the paint, it has been necessary to mill the paint to break down overly-large particles of phosphor and phosphor agglomerates. These large particles and particle agglomerates would otherwise give the coated lamp a coarse or grainy appearance which would impair its acceptability by the customer. While milling the phosphor in forming the coating paint does provide this suspension or paint with a suitable texture, it has been found that additional phosphor particles having decreased output are produced by this paint milling. This of course reduces the total output for the resulting fluorescent lamp.

The fluorescent lamp art is highly competitive and a lamp which has an output of one or two lumens per watt greater than a competitive lamp will normally be sold over an otherwise-similar competitive lamp. Thus any improvement which will result in an appreciable increase in output and efficiency has a great effect in promoting one lamp over another competitive lamp.

It is the general object of this invention to provide a method for improving the luminosity output of halophosphate phosphors for use in fluorescent lamps.

It is a further object to provide improved halophosphate phosphor for use in fluorescent lamps, which phosphor has been processed by an improved method.

It is another object to provide a fluorescent lamp which incorporates halophosphate phosphor which has been processed by an improved method to improve its output.

It is still another object to provide details for a method for improving the luminosity output characteristics for halophosphate phosphors.

The aforesaid objects of the invention, and other objects which will become apparent as the description proceeds, are achieved by providing an improved method for processing halophosphate phosphor after formation by firing to improve the output of the fluorescent lamp incorporating such phosphor. Briefly, this method comprises first finely dividing the phosphor after formation by firing so that substantially all resulting phosphor particles have a diameter less than a predetermined value. Thereafter the finely-divided phosphor is mixed with an aqueous acidic or basic solution. Substantially all residual acid or base is then removed from the phosphor and a liquid slurry is formed with the resulting finely-divided phosphor. The phosphor-liquid slurry is atomized in a gaseous medium and the atomized slurry is exposed to a temperature which is appreciably greater than the boiling point of the liquid, but less than the firing temperature which is used in initially forming or making the phosphor. This has the effect of evaporating in an extremely rapid fashion the liquid of the slurry and dries the phosphor as a fluffy and non-agglomerated powder. At least a substantial portion of the dried phosphor powder is separated from the gaseous medium which contains the evaporated liquid of the slurry and the separated phosphor powder is collected for coating onto a fluorescent lamp envelope, without further reduction in phosphor particle size. Preferably the collected phosphor powder is stirred with a volatile vehicle and a small amount of vehicle-soluble binder to form a phosphor-vehicle suspension or paint suitable for phosphor coating a fluorescent lamp envelope. Envelope coating with this paint is conventional. After envelope coating, the lamp fabrication is completed by conventional techniques. By this method, all milling of the phosphor which might damage or alter the phosphor particles is accomplished after the phosphor is washed with the acidic or basic solution. There is also provided the resulting improved phosphor and the lamp incorporating such improved phosphor.

For a better understanding of the invention, reference should be had to the accompanying drawings wherein.

Figure 1:
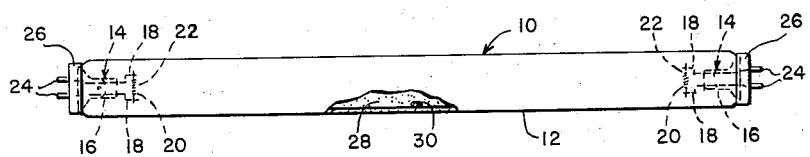
FIG. 1 is an elevational view, partly in section, of a fluorescent lamp incorporating the improved halophosphate phosphor material of this invention.

With specific reference to the form of the invention illustrated in the drawing, the numeral 10 in FIG. 1 illustrates generally a 40W T12 type fluorescent lamp comprising a tubular, light-transmitting vitreous envelope 12 which is fabricated of the usual soda-lime-silica glass for example. Mounts 14 are sealed into either end of the envelope 12 as is customary. Each mount comprises a vitreous portion 16 sealed to the end of the envelope 12 with lead conductors 18 sealed therethrough and supporting at their inwardly-extending extremities refractory metal coils 20, which are fabricated of tungsten for example. These coils are of conventional coiled-coil construction or of a triple-coil construction and contained within the turns of the inner coil or coils is a filling of electron-emitting material 22. Such electron-emitting materials are well known and normally comprise a mixture of alkaline-earth oxides which may have other materials such as zirconia added thereto. As a specific example, the electron-emitting material comprises a mixture of 60% by weight barium oxide, 30% by weight calcium oxide and 10% by weight strontium oxide.

Electrical connection for the lead conductors 18 is normally effected by contact pins 24 which project from supporting base caps 26 at either end of the lamp 10. The envelope 12 has coated on its inner surface a phosphor material 28, which in accordance with this invention comprises halophosphate phosphor material which has been processed by the present method. The envelope also contains a small filling of argon or other inert, ionizable gas, at a pressure of about 4 mm. for example, in order to facilitate starting, and other starting gas fill pressures can be used, as is well known. Also contained within the envelope 12 is the usual small charge of mercury 30. In the operation of such a lamp, the phosphor 28 responds to the 2537 A.U. resonant radiation of the mercury discharge to produce longer wavelength radiations.

The halophosphate phosphor material is first processed conventionally by mixing together the raw-mix constituents and firing same in accordance with the predetermined schedule. Following are specific examples.

*Example I*

| Raw-mix constituent: | Grams |
| --- | --- |
| CaO | 583 |
| $P_2O_5$ | 538 |
| Mn (added as manganous carbonate) | 10.17 |
| $Sb_2O_3$ | 31.0 |
| $SrCl_2$ | 48.0 |
| $CaF_2$ | 77.3 |

NOTE.—In the foregoing example, the metal to phosphorus molar ratio can be varied from 4.65 to 4.92 to 3. The halide to phosphorous ratio can be varied from 1.02/6 to 1.23/6. The chlorine to fluorine ratio can be varied from 1 mole chlorine to 6 moles fluorine to 1:1. The antimony can be varied from about 1% to about 4% by weight of the phosphor and the manganese can be varied from about 0.7% to about 0.9% by weight of the phosphor.

The foregoing raw-mix constituents are thoroughly mixed or blended by means of a pebble mill, for example. These raw-mix constituents are then fired in a covered crucible at a temperature of about 1185° C. for a period of three hours, although the firing temperatures may vary from 1140° C. to 1195° C. for example, the higher the firing temperature, the shorter the firing time. Also, the firing time will vary with the batch size and depth of material in the crucible. After the first firing, the phosphor material is desirably milled and then refired at a temperature of from 1100° C. to 1130° C. for example, the higher the firing temperature the shorter the firing time. The preferred refiring temperature is about 1120° C. for about 2½ hours. This phosphor is a 4500° K. halophosphate having I.C.I. color coordinates of about $x=0.361$ and $y=0.370$.

*Example II*

| Raw-mix constituents: | Grams |
| --- | --- |
| CaO | 63.6 |
| $P_2O_5$ | 54.4 |
| $Sb_2O_3$ | 1.48 |
| $CaF_2$ | 8.92 |

The foregoing phosphor raw-mix constituents are mixed and fired in a covered crucible at a temperature of about 1180° C. and thereafter desirably milled and refired at a temperature of about 1130° C. for about 2½ hours. The resulting phosphor is a blue halophosphate having I.C.I. color coordinates of about $x=0.215$ and $y=0.268$.

*Example III*

| Raw-mix constituents: | Grams |
| --- | --- |
| CaO | 569 |
| $P_2O_5$ | 538 |
| Mn (as manganous carbonate) | 21.50 |
| $Sb_2O_3$ | 31.0 |
| $SrCl_2$ | 48.0 |
| $CaF_2$ | 77.3 |

The foregoing materials are mixed and fired in a covered crucible at a temperature of about 1140° C. for about 3 hours and thereafter desirably milled and refired at a temperature of about 1090° C. for about 2½ hours. The resulting phosphor is a warm-white halophosphate having color coordinates of about $x=0.436$ and $y=0.404$.

*Example IV*

| Raw-mix constituents: | Grams |
| --- | --- |
| CaO | 569 |
| $P_2O_5$ | 538 |
| Mn (as manganous carbonate) | 16.25 |
| $Sb_2O_3$ | 31.0 |
| $SrCl_2$ | 48.0 |
| $CaF_2$ | 77.3 |

The foregoing raw-mix constituents are mixed and fired at 1130° C. for about 3 hours and thereafter desirably milled and refired at about 1120° C. for about 2 hours. This produces a 3500° K. halophosphate.

The four specific examples given hereinbefore describe a wide range of halophosphate phosphor materials and any of these examples can be processed in accordance with the present method to improve the output of the fluorescent lamp incorporating such phosphor. It should be understood that the present method is applicable to any halophosphate phosphor material and any of the specific examples as given in U.S. Patent No. 2,488,733, dated November 22, 1949 can also be similarly processed to achieve similar beneficial results.

Figure 3:
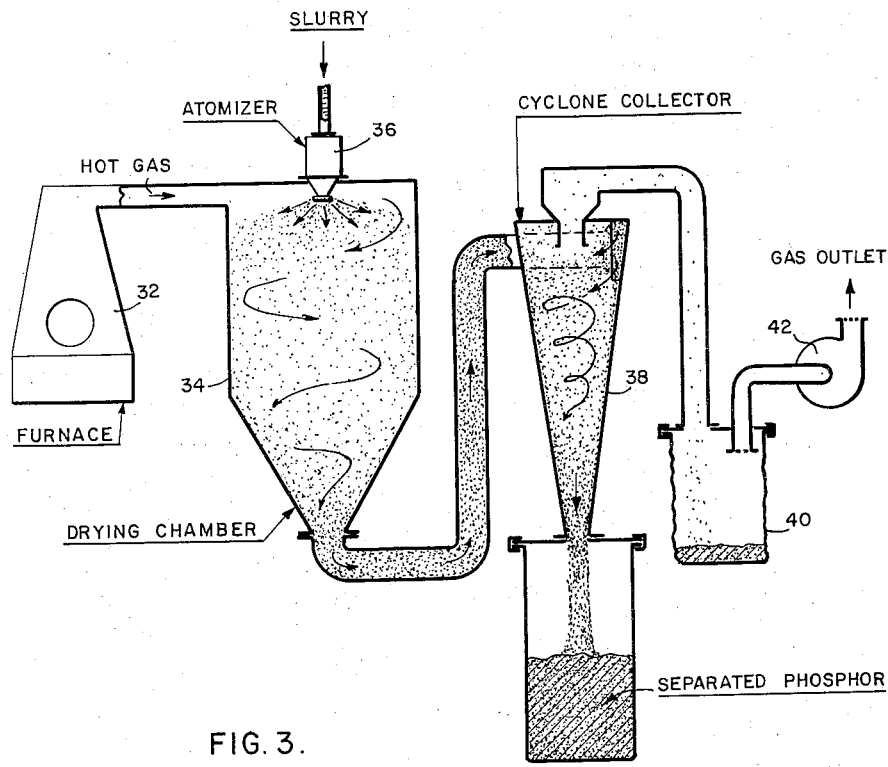
FIG. 3 is a diagrammatic view of a spray drying apparatus used in drying the phosphor in accordance with the present method.
Figure 2:
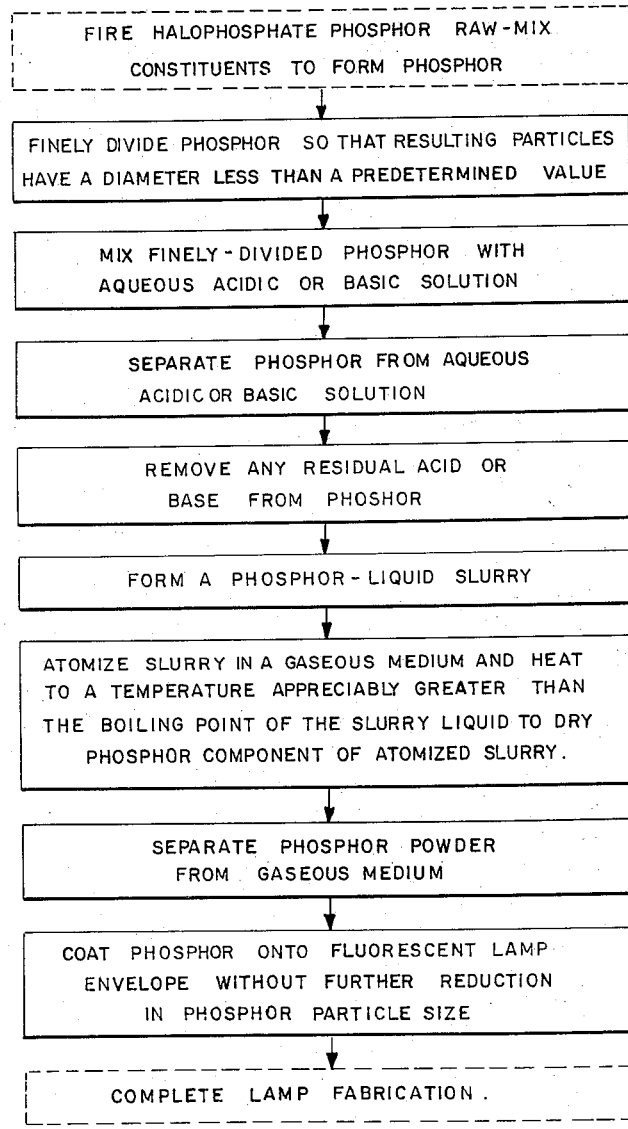
FIG. 2 is a flow chart illustrating the method steps used in processing halophosphate phosphor in accordance with the present invention.

Before processing in accordance with the present invention, the halophosphate phosphor is first initially prepared by firing as indicated hereinbefore. By way of example, the 4500° K. halophosphate phosphor specified under Example I will be considered. As per the flow chart shown in FIG. 2, the phosphor is crushed to finely-divided status after formation by firing so that substantially all particles have a diameter less than a predetermined value, in order that the phosphor when coated will not have a grainy or coarse appearance which might impair commercial acceptance of the completed lamp. For present commercial standards, it has been found that the state of division for the finely-divided phosphor should be such that substantially all particles have a diameter less than 20 microns. The term "particles" as used herein is means to include phosphor particle agglomerates as well as individual phosphor particles. A reduction to the indicated particle size is readily achieved by first hammer-milling the phosphor and then milling same for a prolonged period. As a specific example, 400 grams of the phosphor are mixed with 200 cc. of water and milled for a period of two hours in a one-quart capacity pebble-mill, using three-quarter inch flint pebbles. The finely-divided phosphor is removed from the pebblemill and placed into a stainless steel container with 1300 cc. of 0.1 normal aqueous nitric acid solution. The phosphor-acid mixture is agitated for a period of approximately 2 hours, after which the phosphor is separated from the aqueous acidic solution by filtration. The phosphor is then water rinsed to remove substantially all residual acid. Water rinsing is conveniently accomplished by rinsing the phosphor with one liter of water, repeating the operation three times. On the last water rinse, the phosphor and water are stirred to form a phosphor-water slurry. As an example, the phosphor can comprise 64% by weight of the phosphor-water slurry and the specific gravity of the slurry will be approximately 1.79. This phosphor water slurry is fed into a so-called spray drier. Spray drying equipment is commercially available and as a specific example, a spray drier is generally disclosed in U.S. Patent No. 2,081,909, dated June 1, 1937. A suitable spray drying apparatus is diagrammatically shown in FIG. 3 and essentially comprises an air heater 32 in which a gaseous medium such as air is heated indirectly by gas heaters to a temperature of approximately 600° F. The hot air is piped as a gaseous stream to a drying chamber 34 and the phosphor-water slurry is introduced through an atomizer 36 into the chamber 34 at a rate of approximately 600 milliliters per minute. The air pressure used with the atomizer is not critical and as an example is 100 p.s.i.g. The atomized slurry is thus exposed to a temperature appreciably greater than the boiling point of water and the water of the slurry evaporates into the hot gaseous medium in an extremely rapid fashion so that it literally "explodes" from the phosphor to form a phosphor smoke. Thereafter the gaseous stream carrying the dried phosphor as a smoke and the evaporated water of the slurry are fed into one side of a conventional centrifugal separator 38 known in the art as a cyclone collector. This forces the air stream carrying the particle smoke into a circular path to deposit at least a substantial portion of the phosphor smoke from the gaseous stream because of the centrifugal forces. The deposited powder collects in the bottom of the cyclone collector 38 and is periodically removed. Residual phosphor particles which are not separated from the hot gaseous stream are collected by means of a conventional collecting bag 40 and the gaseous stream passes through the gas-circulating pump 42 and into the atmosphere. For the specific example as described, the temperature of the air leaving the drying chamber 34 will be approximately 300° F. The percent recovery of the phosphor which is collected in the cyclone collector 38 will be approximately 95% of the total amount of phosphor which is introduced as a water slurry into the drying chamber 34. This percent of phosphor recovery can vary considerably, depending on operating conditions. The collected phosphor powder will be extremely dry and actual measurements of moisture in the collected phosphor indicate that it is in the order of about 0.01% by weight of the phosphor.

The collected dried phosphor is then stirred with a volatile vehicle and a small amount of vehicle-soluble binder to form a phosphor-vehicle suspension or so-called paint which is suitable for coating a fluorescent lamp envelope. As a specific example, 400 grams of the phosphor are mixed with 540 cc. of xylol and 110 cc. of butanol, together with 14 grams of ethyl cellulose having a viscosity of 300 cps. The mixture is stirred with any conventional power-driven stirring mechanism for a period of approximately one-half hour for example. This forms a homogeneous suspension or paint of the very finely divided phosphor material. This paint may be further thinned if desired. The prepared paint is flushed over the inside of a fluorescent tube, after which the ethyl cellulose binder is volatilized by lehring the coated tube at a temperature of about 650° C. for about three minutes for example. Thereafter lamp fabrication is completed in accordance with conventional practices.

The foregoing phosphor processing is subject to considerable variation. By way of example, the initial crushing of the phosphor to reduce it to a finely-divided status can be accomplished in reducing mechanisms other than a pebblemill and alternatively, phosphor particles having a diameter of 20 microns and greater can be fractionated from the remaining phosphor by means of an air-separation or water-settling technique. The actual state of division of the milled phosphor is not critical, provided that substantially all larger phosphor particles have a diameter less than 20 microns. For the specific example given hereinbefore, the average particle diameter of the initially-milled phosphor is about 10 microns. If a more-extended initial milling is utilized, a greater number of smaller and damaged phosphor particles will be produced and subsequently removed by the later acidic washing solution. Conversely, if less initial milling is utilized, fewer smaller and damaged phosphor particles will be produced. Nitric acid is preferred for washing the phosphor although other acids and mineral acids such as hydrochloric and sulphuric can be substituted therefor. The normality of the aqueous acidic solution is subject to a wide latitude. In the case of the preferred nitric acid, normalities of from 0.01 to 0.3 can be used and even this wide range is not critical. The relative proportions of the preferred acidic washing solution and phosphor are subject to wide variation as is the time which the acidic solution and phosphor are mixed. Acid washing of the phosphor and milling to achieve a predetermined phosphor particle diameter can be consolidated into one step by wet-milling the fired phosphor with an acidic solution. Preferably the acid washing follows the phosphor milling. Phosphor rinsing to remove residual traces of acid is also subject to variation and more or fewer rinses can be used if desired.

The relative proportions of phosphor and water of the slurry which is sprayed into the drying chamber 34 can be varied considerably. If more water is used with respect to the relative amount of phosphor, less phosphor can be handled at one time since substantially all of the water is desirably evaporated in a rapid fashion. Conversely, much less water with respect to the phosphor can be used provided the slurry can be readily atomized when it is introduced into the drying chamber 34. Other liquids can be substituted for the water in forming the slurry although water is preferred because of cost and ease of handling. In the preferred processing, the phosphor-water slurry is atomized into a heated stream of air. Other gaseous media such as nitrogen can be substituted for air, but the latter is preferred because of cost. Alternatively, the slurry can be atomized into a gaseous medium such as air and both heated directly by radiant heaters to a temperature appreciably greater than the boiling point of water.

The temperature of the gaseous medium into which the slurry is atomized is not critical provided that it is appreciably greater than the boiling point of water so that the water of the atomized slurry will evaporate in a rapid fashion. By way of example, temperatures for the heated air stream of from 500° F. to 1000° F. have been found satisfactory and even this wide temperature range can be extended. The temperature of the heated gaseous medium should be less than the firing temperature which is used in making the phosphor, however, in order that the phosphor is not damaged. As a practical matter the temperature of the heated gaseous medium into which the slurry is atomized will be considerably below the temperature used in firing the phosphor raw-mix constituents to form the phosphor. In the preferred form of the present invention, the phosphor smoke is separated from the hot air stream by means of a centrifugal separator. As an alternative means for separating the phosphor from the heated air, the phosphor-water slurry can be sprayed into a heated chamber and the dried phosphor smoke allowed to settle to the bottom of the heated chamber where it can be collected.

The paint vehicle and vehicle-soluble binder are also subject to considerable variation as are the relative proportions of phosphor and vehicle which comprise the paint. While ethyl cellulose binder and xylol-butanol vehicle have been given in the preferred example, a vehicle and vehicle-soluble binder of butyl acetate and nitrocellulose or water and methyl cellulose or other organic binder can be substituted for the xylol-butanol vehicle and ethyl cellulose binder. Reference is made to copending application S.N. 606,888, filed August 29, 1956, and owned by the present assignee, now Patent No. 2,976,249, for details with respect to a butyl acetate vehicle and nitrocellulose binder suitable for coating a phosphor. Inorganic binders such as boric acid can be substituted for the indicated organic binders. While any conventional stirring device can be used to suspend the phosphor in the vehicle-binder solution, a rotary shear homogenizer stirring device will shorten the time required to suspend the phosphor when forming the paint.

In practicing the present method, the aqueous acidic washing solution is preferred and the detailed description includes this preferred embodiment. If desired, the aqueous acidic solution used to wash the finely-divided phosphor after initial milling can be replaced by a basic washing solution. Examples are an aqueous solution of ammonium or sodium hydroxide having a hydroxyl concentration equivalent to the hydrogen ion concentration for the preferred acid washing solution. Except for the substitution of the base for the acid, the other steps in the present method remain the same.

It is necessary to the present method that the phosphor-water slurry be atomized in the gaseous medium and exposed to a temperature appreciably greater than the boiling point of water in order to enable the collected dry phosphor powder to be suspended in a vehicle-binder solution by means of a simple stirring, without further reduction in particle size. If the phosphor is first milled to the indicated particle size, thereafter mixed with the aqueous acidic or basic solution, rinsed to remove substantially all residual traces of acid and then dried without the use of a spray drying technique, the phosphor on drying will contain many agglomerated particles of considerable size. Such a dried phosphor requires considerable milling to form a paint which will provide the finished lamp with an acceptable coating texture. In accordance with the present method, the objectionable milling previously used to suspend the phosphor in the vehicle-binder solution is eliminated, which milling as noted hereinbefore decreases the phosphor particle size and also the luminosity of at least some of the phosphor particles. The function of the spray drying step in preventing the formation of phosphor agglomerations is apparently due to the rapid and almost explosive drying of the atomized slurry when it is injected into the hot gaseous medium. This apparently dries any phosphor which may be dissolved and very finely-divided phosphor particles dry individually. This eliminates any tendency to cement the phosphor particles together.

In control tests on a series of 40W T12 lamps coated with the indicated 4500° K. halophosphate phosphor, approximately 50 lumens were gained by processing the phosphor in accordance with the present method. Otherwise expressed, milling of the phosphor to place it into suspension in forming the coating paint damages the phosphor to such an extent that the luminosity of a lamp incorporating such milled phosphor is decreased about 50 lumens. Other halophosphate phosphor materials show an equivalent gain in luminosity through processing in accordance with the present method.

As another possible advantage to be realized from the present method, the dried phosphor is preferably separated from the air stream by forcing the hot gaseous stream which carries the particle smoke and the evaporated water into a circular motion. The larger and consequently heavier phosphor particles will be first deposited and extremely fine particles are not deposited as readily from the circulating air stream. At least some of these very fine particles remain undeposited as a smoke in the air stream and are thus separated from the deposited phosphor. It is known that the very fine particles of phosphor have a decreased luminosity as compared to the remainder of the phosphor particles and the so-called cyclone separator thus introduces a phosphor fractionating step into the present method to remove extremely fine phosphor particles. This further promotes increased luminosity for halophosphate phosphor processed in accordance with the present method.

As an alternative method for coating the inner surface of a fluorescent lamp envelope, the present dried and finely-divided phosphor can be coated without further reduction in particle size by means of an electrostatic process, as disclosed in U.S. Patent No. 2,538,562, dated January 16, 1951. Halophosphate phosphor which has been previously milled to a predetermined small particle size, washed with an acidic or basic solution, rinsed and then dried with a spray-drying technique is readily adapted to be deposited by such an electrostatic deposition process, since the dried and finely-divided phosphor is substantially free of particle agglomerates and is readily formed into a phosphor smoke.

It will be recognized that the objects of the invention have been achieved by providing a method for improving the luminosity output of halophosphate phosphors for use in fluorescent lamps. There has also been provided an improved halophosphate phosphor for use in fluorescent lamps as well as a fluorescent lamp which incorporates such improved phosphor. Method details for improving such phosphor have also been provided.

As a possible alternative embodiment, the present improved halophosphate phosphor may be mixed or blended with other phosphor materials in order to achieve desired color effects for the coated lamps. Improved luminosity will still be present in proportion to the amount of the halophosphate phosphor which is used in the blend. As a specific example, a "soft white" blend of phosphor is prepared by mixing the following:

| Phosphor | Percent by weight |
| --- | --- |
| 4500° K. halo (Example I) | 20.8 |
| Blue halo (Example II) | 28 |
| Calcium silicate: 0.03% Mn: 0.0045% Pb | 51.2 |

Many other blends which incorporate varying proportions of halophosphate phosphors can also be prepared, as is well known.

While best-known embodiments have been illustrated and described in detail, it is to be particularly understood that the invention is not limited thereto or thereby.

I claim:

1. The method of processing halophosphate phosphor after formation by firing to improve the output of the fluorescent lamp incorporating such phosphor, which method comprises, finely-dividing fired halophosphate phosphor so that substantially all particles have a diameter less than a predetermined value, mixing the finely-divided phosphor and a solution of the group consisting of an aqueous acid washing solution and an aqueous basic washing solution, separating the phosphor from the aqueous washing solution, removing substantially all residual washing solution from the phosphor and forming a liquid slurry of the finely-divided phosphor, atomizing the phosphor-liquid slurry in a gaseous medium, subjecting the atomized slurry to a temperature appreciably greater than the boiling point of the liquid component of the slurry but less than the firing temperature used in making the phosphor to evaporate the liquid component of the atomized slurry into the gaseous medium, separating at least a substantial portion of the resulting dried finely-divided phosphor from the gaseous medium containing the evaporated liquid of the slurry, and thereafter coating the phosphor onto the inner surface of a fluorescent lamp envelope without further reduction in phosphor particle size.

2. The method of processing halophosphate phosphor after formation by firing to improve the output of the fluorescent lamp incorporating such phosphor, which method comprises, milling fired halophosphate phosphor and a solution of the group consisting of an aqueous acid solution and an aqueous basic solution a sufficient amount to finely divide the phosphor so that substantially all particles have a diameter less than a predetermined value, separating the finely-divided phosphor from the aqueous milling solution, removing substantially all residual milling solution from the phosphor and forming a liquid slurry of the finely-divided phosphor, atomizing the phosphor-liquid slurry in a gaseous medium, subjecting the atomized slurry to a temperature appreciably greater than the boiling point of the liquid component of the slurry but less than the firing temperature used in making the phosphor to evaporate the liquid component of the atomized slurry into the gaseous medium, separating at least a substantial portion of the resulting dried finely-divided phosphor from the gaseous medium containing the evaporated liquid of the slurry, and thereafter coating the phosphor onto the inner surface of a fluorescent lamp envelope without further reduction in phosphor particle size.

3. The method of processing halophosphate phosphor after formation by firing and before lamp envelope coating to improve the output of the fluorescent lamp incorporating such phosphor, which method comprises, finely dividing fired halophosphate phosphor so that substantially all particles have a diameter less than a predetermined value, mixing the finely-divided phosphor and an aqueous acid solution, separating the phosphor from the aqueous acid solution, removing substantially all residual acid solution from the phosphor, forming a liquid slurry of the finely-divided phosphor, atomizing the phosphor-liquid slurry in a gaseous medium, subjecting the atomized slurry to a temperature appreciably greater than the boiling point of the liquid component of the slurry but less than the firing temperature used in making the phosphor to evaporate the liquid component of the atomized slurry into the gaseous medium, separating at least a substantial portion of the resulting dried finely-divided phosphor from the gaseous medium containing the evaporated liquid of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

4. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous acid solution, separating the phosphor from the aqueous acid solution, removing substantially all residual acid from the phosphor, forming a liquid slurry of the finely-divided phosphor, atomizing the phosphor-liquid slurry in a gaseous medium, exposing the atomized slurry to a temperature appreciably greater than the boiling point of the liquid component of the slurry and less than the firing temperature used in making the phosphor to evaporate the liquid component of the atomized slurry into the gaseous medium, separating at least a substantial portion of the resulting dried finely-divided phosphor from the gaseous medium containing the evaporated liquid of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

5. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a gaseous medium, exposing the atomized slurry to a temperature appreciably greater than the boiling point of water and less than the firing temperature used in making the phosphor to evaporate the water component of the atomized slurry into the gaseous medium, separating at least a substantial portion of the resulting dried finely-divided phosphor from the gaseous medium containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

6. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a gaseous medium heated to a temperature appreciably greater than the boiling point of water and less than the firing temperature used in making the phosphor to evaporate into the hot gaseous medium the water component of the atomized slurry, separating at least a substantial portion of the dried finely-divided phosphor from the hot gaseous medium containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

7. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing together the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a gaseous stream heated to a temperature appreciably greater than the boiling point of water and less than the firing temperature used in making the phosphor to evaporate into the hot gaseous stream the water component of the atomized slurry, separating at least a substantial portion of the dried finely-divided phosphor from the hot gaseous stream containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

8. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous basic solution, separating the phosphor from the aqueous basic solution, removing substantialy all residual base from the phosphor, forming a water slurry of the finely-divided phosphor, atomizing the phosphor-water slurry in a gaseous medium heated to a temperature appreciably greater than the boiling point of water and less than the firing temperature used in making the phosphor to evaporate into the hot gaseous medium the water component of the atomized slurry, separating at least a substantial portion of the dried finely-divided phosphor from the hot gaseous medium containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

9. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a continuous gaseous stream heated to a temperature appreciably greater than the boiling point of water and less than the firing temperature used in initially making the phosphor to evaporate into the hot gaeous stream the water component of the atomized slurry and carry as a particle smoke the dried finely-divided phosphor, forcing into a circular path the moisture- and particle-smoke carrying hot gaseous stream to deposit therefrom by centrifugal force at least a substantial portion of the smoke of dried finely-divided phosphor particles, collecting the deposited and dried finely-divided phosphor particles, and thereafter stirring the collected finely-divided phosphor together with the volatile vehicle and a small amount of vehicle-soluble binder to form a phosphor-vehicle suspension suitable for phosphor coating a fluorescent lamp envelope.

10. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and an aqueous nitric acid solution, separating the phosphor from the aqueous nitric acid solution, water rinsing the phosphor to remove substantially all residual nitric acid therefrom, forming a water slurry of the finely-divided phosphor, atomizing the phosphor-water slurry in a continuous gaseous stream heated to a temperature of from 500° F. to 1000° F. to evaporate into the hot gaseous stream the water component of the atomized slurry and carry as a particle smoke the dried finely-divided phosphor, forcing into a circular path the moisture- and particle-smoke carrying hot gaseous stream to deposit therefrom by centrifugal force at least a substantial portion of the smoke of dried finely-divided phosphor particles, and thereafter stirring the deposited finely-divided phosphor together with a volatile vehicle and a small amount of vehicle soluble binder to form a phosphor-vehicle suspension suitable for phosphor coating a fluorescent lamp envelope.

11. The method of processing halophosphate phosphor after formation by firing and before lamp envelope coating to improve the output of the fluorescent lamp incorporating such phosphor, which method comprises, finely dividing fired halophosphate phosphor so that substantially all resulting phosphor particles have a diameter less than 20 microns, mixing the finely-divided phosphor and aqueous nitric acid solution having a normality of about 0.1, separating the phosphor from the aqueous nitric acid solution, water rinsing the phosphor to remove substantially all residual nitric acid from the phosphor, forming a water slurry of the finely-divided phosphor, atomizing the phosphor-water slurry in a continuous gaseous stream heated to a temperature of from 500° F. to 1000° F. to evaporate into the hot gaseous stream the water component of the atomized slurry and carry as a particle smoke the dried finely-divided phosphor, forcing into a circular path the moisture- and particle-smoke carrying hot gaseous stream to deposit therefrom by centrifugal force about 95% of the smoke of dried finely-divided phosphor particles, and thereafter stirring the deposited finely-divided phosphor together with the xylol-butanol vehicle and a small amount of ethyl cellulose binder to form a phosphor-vehicle suspension suitable for phosphor coating a fluorescent lamp envelope.

12. A halophosphate phosphor for use in fluorescent lamps, said phosphor having been processed after formation by firing and before lamp envelope coating by the method which comprises, finely dividing fired halophosphate phosphor so that substantially all resulting phosphor particles have a diameter less than a predetermined value, mixing the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a gaseous medium heated to a temperature appreciably greater than the boiling point of water and less than the firing temperature used in making the phosphor to evaporate into the hot gaseous medium the water component of the atomized slurry, separating at least a substantial portion of the dried finely-divided phosphor from the hot gaseous medium containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

13. A fluorescent lamp comprising a light-transmitting envelope having electrodes operatively disposed therein and containing an inert ionizable gas and a charge of mercury, a halophosphate phosphor coating on the inner surface of said envelope, said phosphor having been processed after formation by firing and before lamp envelope coating by the method comprising, finely dividing fired halophosphate phosphor so that substantially all resulting phosphor particles have a diameter less than a predetermined value, mixing the finely-divided phosphor and an aqueous acid solution, separating the phosphor from the aqueous acid solution, removing substantially all residual acid from the phosphor, forming a water slurry of the finely-divided phosphor, atomizing the phosphor-water slurry in a gaseous medium heated to a temperature appreciably greater than the boiling point of water and less than the firing temperature used in making the phosphor to evaporate into the hot gaseous medium the water component of the atomized slurry, separating at least a substantial portion of the dried finely-divided phosphor from the hot gaseous medium containing the evaporated water of the slurry, and thereafter stirring the dried and separated finely-divided phosphor together with a volatile vehicle and a small amount of vehicle-soluble binder to form a phosphor-vehicle suspension suitable for phosphor coating a fluorescent lamp envelope.

14. The method of processing halophosphate phosphor after formation by firing, which method comprises, finely dividing prepared halophosphate phosphor so that substantially all particles have a diameter less than a predetermined value, mixing the finely divided phosphor and one solution of the group consisting of an aqueous acid washing solution and an aqueous basic washing solution, separating the phosphor from the aqueous washing solution, removing substantially all residual washing solution from the phosphor, forming a liquid slurry of the finely divided phosphor, atomizing the phosphor-liquid slurry into a gaseous medium, subjecting the atomized slurry to a temperature appreciably greater than the boiling point of the liquid component of the slurry but less than the firing temperature used in initially making the phosphor to evaporate the liquid component of the atomized slurry into the gaseous medium, and separating at least a substantial portion of the resulting dried finely divided phosphor from the gaseous medium containing the evaporated liquid of the slurry.

References Cited in the file of this patent

UNITED STATES PATENTS

| | | |
|---|---|---|
| 2,755,254 | Butler | July 17, 1954 |
| 2,772,241 | Ramby | Nov. 27, 1956 |
| 2,806,970 | Meister et al. | Sept. 17, 1957 |
| 2,814,748 | Cox | Nov. 26, 1957 |
| 2,838,707 | Schwing | June 10, 1958 |